(12) United States Patent
Chen et al.

(10) Patent No.: US 7,391,963 B2
(45) Date of Patent: Jun. 24, 2008

(54) METHOD OF CONTROLLING MULTIMEDIA AUDIO AND VIDEO PLAYBACK

(75) Inventors: Chung Hui Chen, Taipei (TW); Fu Zen Hsieh, Taipei (TW)

(73) Assignee: Inventec Corporation, Taipei (TW)

( * ) Notice: Subject to any disclaimer, the term of this patent is extended or adjusted under 35 U.S.C. 154(b) by 917 days.

(21) Appl. No.: 10/671,462

(22) Filed: Sep. 29, 2003

(65) Prior Publication Data

US 2005/0069280 A1      Mar. 31, 2005

(51) Int. Cl.
*H04N 5/00* (2006.01)
*H04N 5/91* (2006.01)
*H04N 7/00* (2006.01)

(52) U.S. Cl. ............ 386/125; 386/126; 386/95

(58) Field of Classification Search ........ 386/95, 386/125–126
See application file for complete search history.

(56) References Cited

U.S. PATENT DOCUMENTS

| | | | | |
|---|---|---|---|---|
| 4,899,326 A * | 2/1990 | Takeya et al. | ............ | 369/30.83 |
| 4,962,494 A * | 10/1990 | Kimura | ............ | 369/47.25 |
| 5,113,383 A * | 5/1992 | Amemiya et al. | ............ | 369/30.06 |
| 5,274,816 A * | 12/1993 | Oka | ............ | 713/2 |
| 5,448,741 A * | 9/1995 | Oka | ............ | 713/2 |
| 5,581,785 A * | 12/1996 | Nakamura et al. | ............ | 710/8 |
| 5,761,406 A * | 6/1998 | Kobayashi et al. | ............ | 714/24 |
| 5,825,649 A * | 10/1998 | Yoshimura | ............ | 700/82 |
| 5,862,107 A * | 1/1999 | Goto | ............ | 386/126 |
| 5,892,952 A * | 4/1999 | Seko et al. | ............ | 717/174 |
| 6,128,434 A * | 10/2000 | Hirayama et al. | ............ | 386/97 |
| 6,288,991 B1 * | 9/2001 | Kajiyama et al. | ............ | 369/47.23 |
| 6,681,325 B1 * | 1/2004 | Marsh et al. | ............ | 713/2 |
| 6,965,727 B1 * | 11/2005 | Sawabe et al. | ............ | 386/96 |
| 7,085,477 B2 * | 8/2006 | Fujii et al. | ............ | 386/96 |
| 2001/0002223 A1 * | 5/2001 | Watanabe | ............ | 386/75 |
| 2001/0040842 A1 * | 11/2001 | Yokota et al. | ............ | 369/32 |
| 2002/0031065 A1 * | 3/2002 | Kajiyama et al. | ............ | 369/47.23 |
| 2002/0072818 A1 * | 6/2002 | Moon et al. | ............ | 700/94 |
| 2003/0039472 A1 * | 2/2003 | Kim | ............ | 386/126 |
| 2003/0086681 A1 * | 5/2003 | Miyagawa | ............ | 386/34 |
| 2004/0042763 A1 * | 3/2004 | Morita et al. | ............ | 386/46 |
| 2004/0120228 A1 * | 6/2004 | Han | ............ | 369/30.25 |

* cited by examiner

*Primary Examiner*—Thai Q. Tran
*Assistant Examiner*—Daquan Zhao
(74) *Attorney, Agent, or Firm*—Bacon & Thomas, PLLC

(57) ABSTRACT

This invention discloses a method of controlling the multimedia audio and video playback by installing an audio/video playback program, a playback control program, and a data storage medium in a computer device, wherein the audio/video playback program adjusts a setup value for each of the playback setup options and saves the adjusted setup value into the data storage medium, such that after the computer device is booted every time, the playback control program detects the execution of the audio/video playback program and determines whether or not a multimedia file is waiting to be executed; if yes, it loads the setup value of the playback setup option from the data storage medium, so that the audio/video playback program can play the multimedia file according to the content of the setup value.

7 Claims, 3 Drawing Sheets

METHOD OF CONTROLLING MULTIMEDIA AUDIO AND VIDEO PLAYBACK

BACKGROUND OF THE INVENTION

1. Field of the Invention

The present invention relates to a method of controlling the multimedia audio and video playback.

2. Description of the Related Art

Nowadays, people pay more and more attention on entertainment, but with the concept of personal privacy and freedom, many people are unwilling to wait in a line for a ticket, or stay in a public place (such as a cinema) with poor air ventilation, and sit in a small seat next to a group of total strangers to watch a movie. It is not regarded as an enjoyment, but is a torture instead. On the other hand, since the audio and video equipments and information products are improved constantly and integrated perfectly to show the audio and video effects, it has reached an excellent state. Based on the description above, people prefer staying at home to appreciate a program on CD or an online satellite program.

Due to the popularity of computer devices (such as a notebook computer or a desktop computer), many people usually run the multimedia file (such as an audio/video CD) directly on a notebook computer or a desktop computer as a main playback tool in order to save the money for buying an audio/video playback device (DVD player or VCD player). In general, if a computer is used to watch a movie, it is necessary to install an audio and video playback program (Win DVD or Media Player). Such playback program has a plurality of playback setup options (such as volume, language, screen, and caption, etc.), so that users may freely adjust the setup values (such as the volume, sound quality, screen size, image brightness, and external screen, etc) for the playback options according to personal preferences. However, the procedure of adjusting such playback options is minute and complicated, and thus it is common for a movie being played for a while before the user completes the adjustment and setup of such playback setup options. Furthermore, since the setup value of these playback setup options cannot be saved, the users have to reset the setup every time when they play a movie, leaving us no alternative but annoyance.

Since movies have different natures (such as war movies, horror movies, and romantic movies, etc.), it is necessary to play it with different playback environment to maximize the audio and video effects. Therefore, viewing a movie of different natures requires adjusting the setup values of the playback option. What would it be if a user just prefers to watch war movies? It is unbearable to the user if it is necessary to readjust the setup for the optimal audio and video effect every time when the user watches the movie of the same nature.

Therefore, it is an urgent need to have a novel invention that allows users to watch a movie or listen to a song by using a computer device without having to go through the complicated setup procedure. The function of playing a movie according to the content and nature easily and quickly is definitely a contribution to the extensive consumers.

SUMMARY OF THE INVENTION

The primary objective of the present invention is to provide a method of controlling the multimedia audio and video playback. When watching a movie by a computer device (such as a notebook computer), the user just needs to run an audio/video playback program (such as Win DVD or Media Player) without further setting or adjusting the setup value every time, and such audio/video playback program will follow the user's preset setup to play the movie. The main technology resides on that such computer device has a playback control program and a data storage medium, wherein after the audio/video playback program has started, it makes adjustment to each of the setup values (such as the volume, sound quality, screen size, image brightness, and external screen, etc) for the playback, and saves the setup data into the data storage medium. Therefore, after the computer device has booted, such playback control program will automatically load the setup values for the playback options if the program detects the execution of such audio/video playback function. The audio/video playback function will play the multimedia file according to the content of the setup values.

BRIEF DESCRIPTION OF THE DRAWINGS

Other features and advantages of the present invention will become apparent in the following detailed description of the preferred embodiments with reference to the accompanying drawing.

DETAILED DESCRIPTION OF THE PREFERRED EMBODIMENTS

Figure 1:
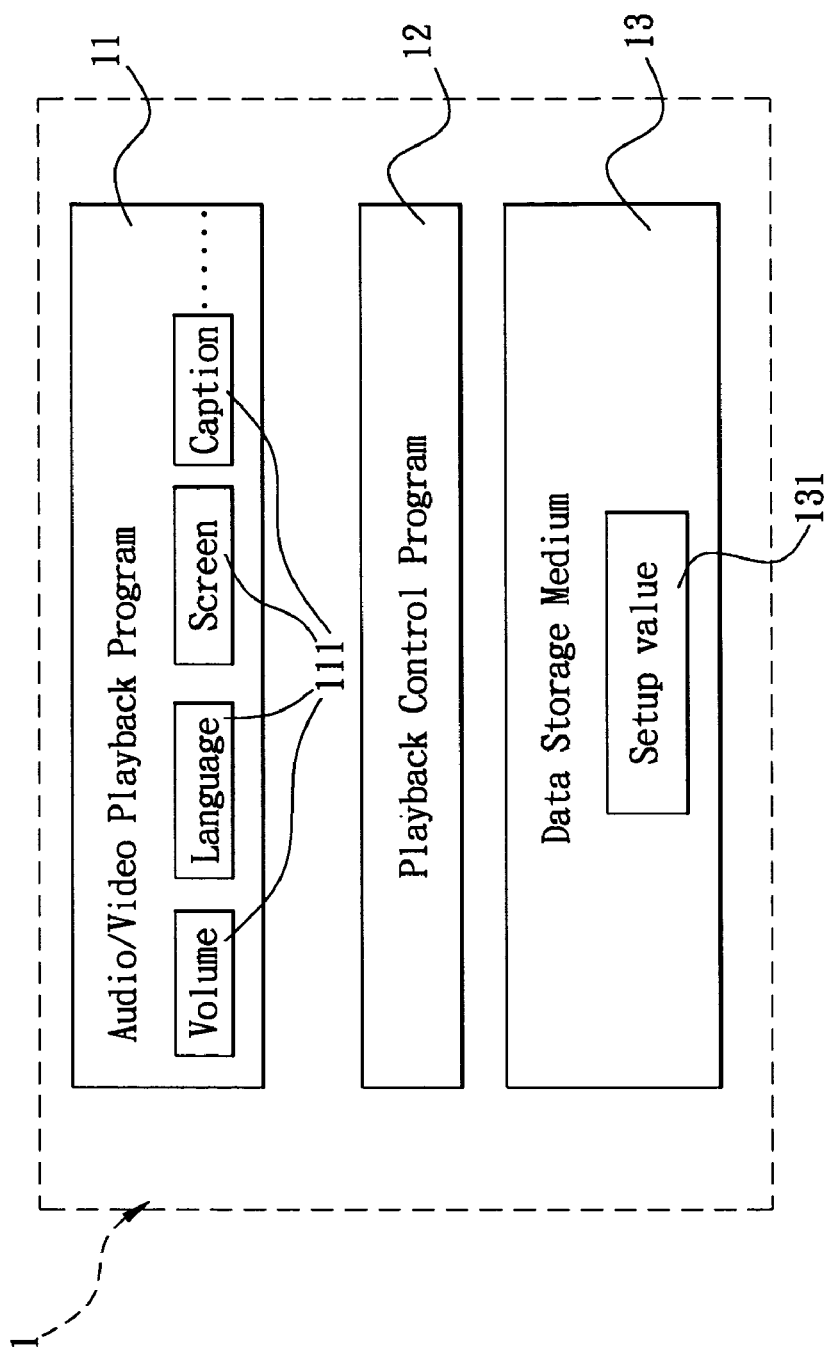
FIG. 1 is an illustrative diagram of the present invention.

This invention discloses a method of controlling the multimedia audio and video playback. Please refer to FIG. 1 for the method in accordance with this invention, comprising a computer device having an audio/video playback program 11 (such as Win DVD or Media Player), a playback control program 12 and a data storage medium 13, wherein after the audio/video playback program 11 is run, each of the playback setup option 111 (such as volume, language, screen, and caption, etc.) performs an adjustment and saves the adjusted setup values 131 (such as the volume, sound quality, screen size, image brightness, and external screen, etc) into the data storage medium 13.

Figure 2:
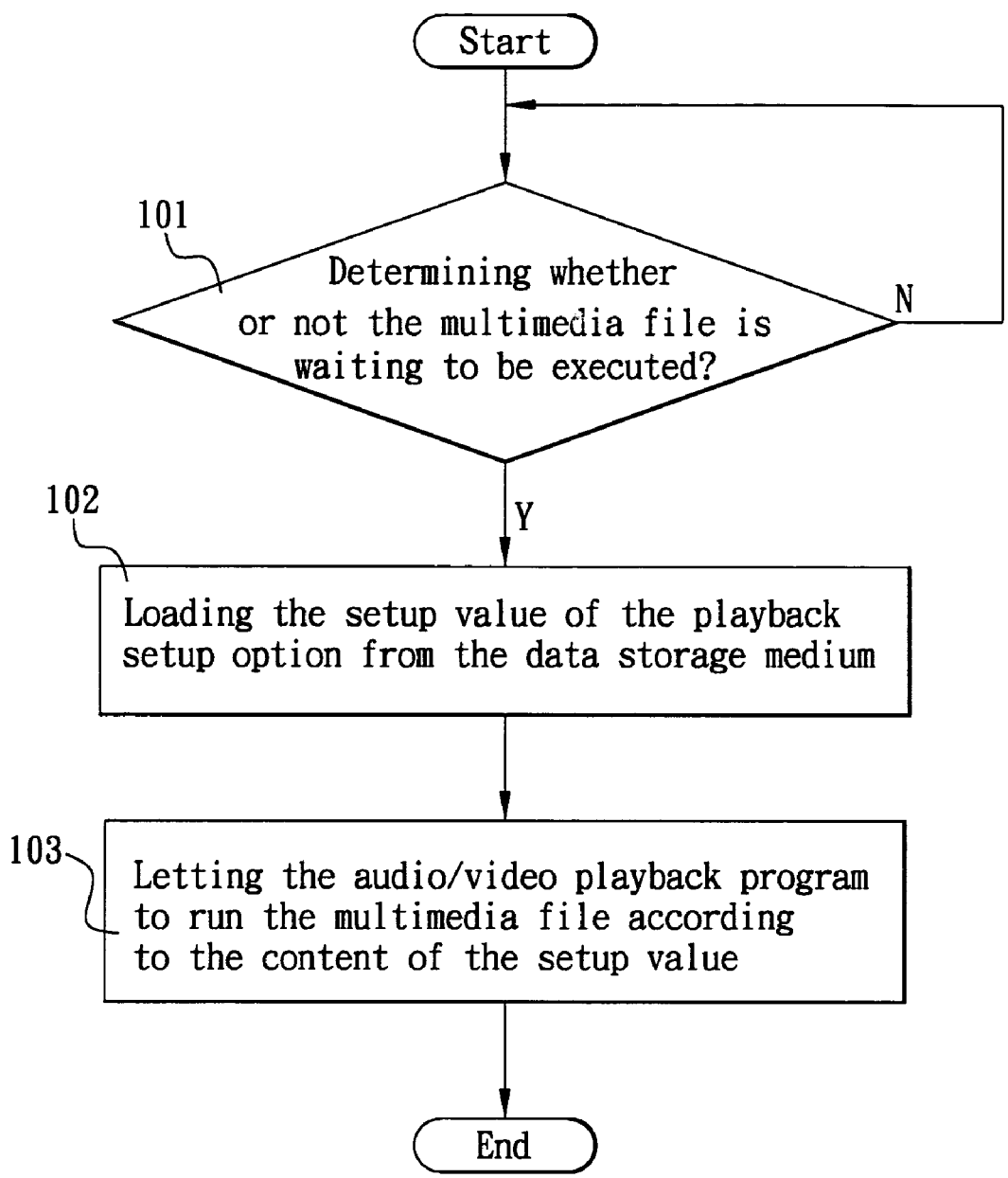
FIG. 2 is a flow chart of the present invention.

Please refer to FIGS. 1 and 2. After the computer device 1 has booted, the playback control program 12 will process and determine according to the following procedure if it has detected the execution of the audio/video playback program 11:

(101) Determining whether or not there is a multimedia file waiting to be executed; if yes, go to next step, or else repeat Step (101);

(102) Loading the setup values 131 from the data storage medium 13 for the playback setup options 111;

(103) Letting the audio/video playback program 11 execute the multimedia file according to the content of the setup values 131.

Please refer to FIG. 1 for this invention. In the figure, the computer device 1 could be a notebook computer or a desktop computer; the data storage medium 13 could be a hard disk or a memory; the multimedia file could be stored in a CD, a floppy disk, or a movie or a song stored in the data storage medium 13.

Figure 3:
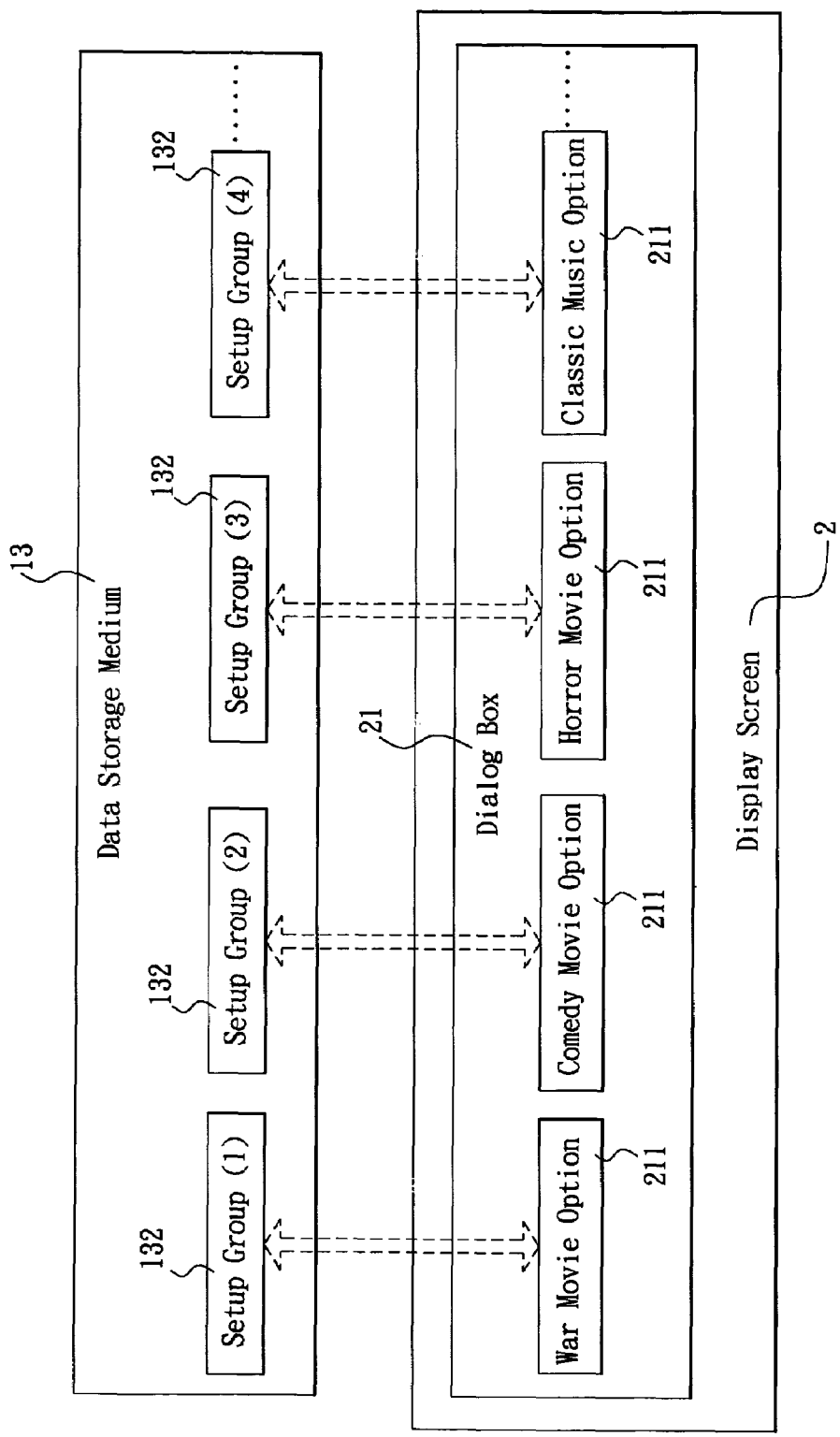
FIG. 3 is another illustrative diagram of the present invention.

Now, assumed that User A prefers watching horror films and the user usually uses a notebook computer as the main viewing tool to play the horror films as shown in FIGS. 1 and 3, User A only needs to run the audio/video playback program 11 first, and adjusts the setup values 131 (such as volume, sound quality, screen size, brightness, and external connection of screen, etc.) for each configuration of the playback setup option 111 of the audio/video playback program 11, and saves the values in the memory or hard disk of the notebook computer. Therefore, when a user wants to watch a horror film for each time, the user just needs to run the audio/video playback program 11 and then the playback control program 12 will detect the execution of the audio/video playback program 11, and automatically load the setup values 131 from the memory or hard disk of the notebook computer, such that the audio/video playback program 11 will play on a display screen 2 of the notebook computer according to the contents of the setup values 131. Therefore, User A no longer needs to adjust or set the playback setup options 111. After User A has opened the audio/video playback program 11, User A can start watching the spectacular content of the horror film.

Since there are many types and properties of movies or songs (such as horror movies, comedy movies, war movies, rock and roll music, jazz music, and classic music, etc), therefore it requires different environments (such as a bright screen quality for viewing a comedy movie, a stronger contrast for viewing a horror movie, a shocking sound effect for listening to rock and roll music, etc) for viewing a movie or listening to a song. Therefore, different playback environments (such as viewing a horror movie, a comedy movie, a war movie or an opera movie, or listening to rock and roll music, sentimental music, love song, or classic music, etc.) are regarded as setup groups 132 of different natures when the setup value 131 of each of these playback setup options 111 are adjusted and saved into the data storage medium 13. In other words, the data storage medium 13 stores a plurality of setup groups 132 of different natures.

Now, assumed that User B prefers watching war movies and comedy movies and listening to classic music. Please refer to FIGS. 1 and 3. Since watching a war movie and a comedy movie requires different contrast and brightness, therefore all playback setup options 111 required for the environment of playing a war movie are saved in the setup group 132 with the name of "War Movie Option", and all playback setup options 111 required for the environment of playing a comedy movie are saved in the setup group 132 with the name of "Comedy Movie Option". In addition, since listening to music emphasizes more on the sound effect than that for watching a movie, therefore User B can save all playback setup options 111 required for the environment of listening to classic music in the setup group 132 with the name of "Classic Music Option".

Hence, when User B wants to watch a comedy movie by using a CD and a notebook computer, User B just needs to turn on the notebook computer and insert the CD into the CD drive to execute the audio/video playback program 11 as shown in FIGS. 1 and 3. The playback control program 12 will detect the execution of the audio/video playback program 11, and displays a dialog box 21 on the display screen 2 of the computer device 1. The dialog box 21 comprises a plurality of playback environment options 211 (such as Horror Movie Option, Comedy Movie Option, Classic Music Option, and Rock and Roll Music Option, etc"; so that after User B has selected an appropriate playback environment option 211 (for example, the Comedy Movie Option), the playback control program 12 will download the setup group 132 corresponding to such playback environment option 211 from the data storage medium 13. The audio/video playback program 11 can play the movie according to the content of the setup group 132, so that User B can view the comedy movie with the corresponding audio/video effect.

Similarly, when User B wants to listen to classic music, User B just needs to select the "Classic Music Option" in the dialog box 21, and the audio/video playback program 11 will play according to the setup group 132 corresponding to the "Classic Music Option". Further, if User A wants to watch a horror movie by a notebook computer, User A just need to select the "Horror Movie Option" in the dialog box 21, and the audio/video playback program 11 will play according to the corresponding "Horror Movie Option". Such arrangement can let users of different personal preferences share the same notebook computer, without affecting the setup values 131 set by each other.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A method of controlling multimedia audio and video playback by installing an audio/video playback program, a playback control program, and a data storage medium in a computer device, wherein said audio/video playback program adjusts setup values for each of a plurality of playback setups under different playback environment options and saves the adjusted setup values into said data storage medium as one of a plurality of setup groups of different natures for enabling the computer device to proceed with the steps of:

said playback control program detecting execution of said audio/video playback program after the computer device has been booted;

when said playback control program detects the execution of said audio/video playback program, said playback control program showing a dialog box comprising a plurality of said playback environment options on a screen of said computer device;

when one of said playback environment options is selected, the playback control program downloading the setup group corresponding to said playback environment option from said data storage medium; and determining whether or not a multimedia file is waiting to be executed and, if yes, loading the setup value of the playback setup option from the data storage medium; wherein said audio/video playback program plays the multimedia file according to the content of said setup value.

2. The method of controlling multimedia audio and video playback of claim 1, wherein said computer device is a notebook computer.

3. The method of controlling multimedia audio and video playback of claim 1, wherein said computer device is a desktop computer.

4. The method of controlling multimedia audio and video playback of claim 1, wherein said data storage medium is a hard disk installed in said computer device.

5. The method of controlling multimedia audio and video playback of claim 1, wherein said data storage medium is a memory installed in said computer device.

6. The method of controlling multimedia audio and video playback of claim 1, wherein said multimedia file is a movie saved in a CD.

7. The method of controlling multimedia audio and video playback of claim 1, wherein said multimedia file is a song saved in a CD.

* * * * *